United States Patent [19]

Yarrow

[11] 4,234,124
[45] Nov. 18, 1980

[54] CONTROL SYSTEM FOR GAS KILN

[76] Inventor: Harry A. Yarrow, 135 S. Sparks St., Burbank, Calif. 92506

[21] Appl. No.: 929,991

[22] Filed: Aug. 1, 1978

[51] Int. Cl.³ .............................................. H05B 1/02
[52] U.S. Cl. ............................. 236/15 BG; 236/46 F; 219/493; 318/484
[58] Field of Search .............. 236/46 R, 15 BG, 46 F, 236/78 C; 318/484, 696; 219/493; 307/108

[56] References Cited

U.S. PATENT DOCUMENTS

| | | | |
|---|---|---|---|
| 2,257,617 | 9/1941 | Pervelis | 236/46 R |
| 2,744,688 | 5/1956 | Ross | 236/46 R |
| 3,036,188 | 5/1962 | Ditto | 236/15 BG |
| 3,949,936 | 4/1976 | Boyer et al. | 236/26 A |

Primary Examiner—William E. Wayner
Attorney, Agent, or Firm—Clarence A. O'Brien; Harvey B. Jacobson

[57] ABSTRACT

A timing mechanism to control the sequential progressive opening of a valve in a gas line leading to a gas fired kiln with the sequential progressive openings taking place at predetermined time intervals until the object being heated in the kiln has matured. Once maturation has taken place, the valve is sequentially progressively closed at predetermined time intervals in order to allow the kiln to cool down slowly. Adjustable controls are provided in order to allow the user to vary the time period between the progressive further opening of the valve and also the degree of opening of the valve to take place at each activation thereof.

13 Claims, 3 Drawing Figures

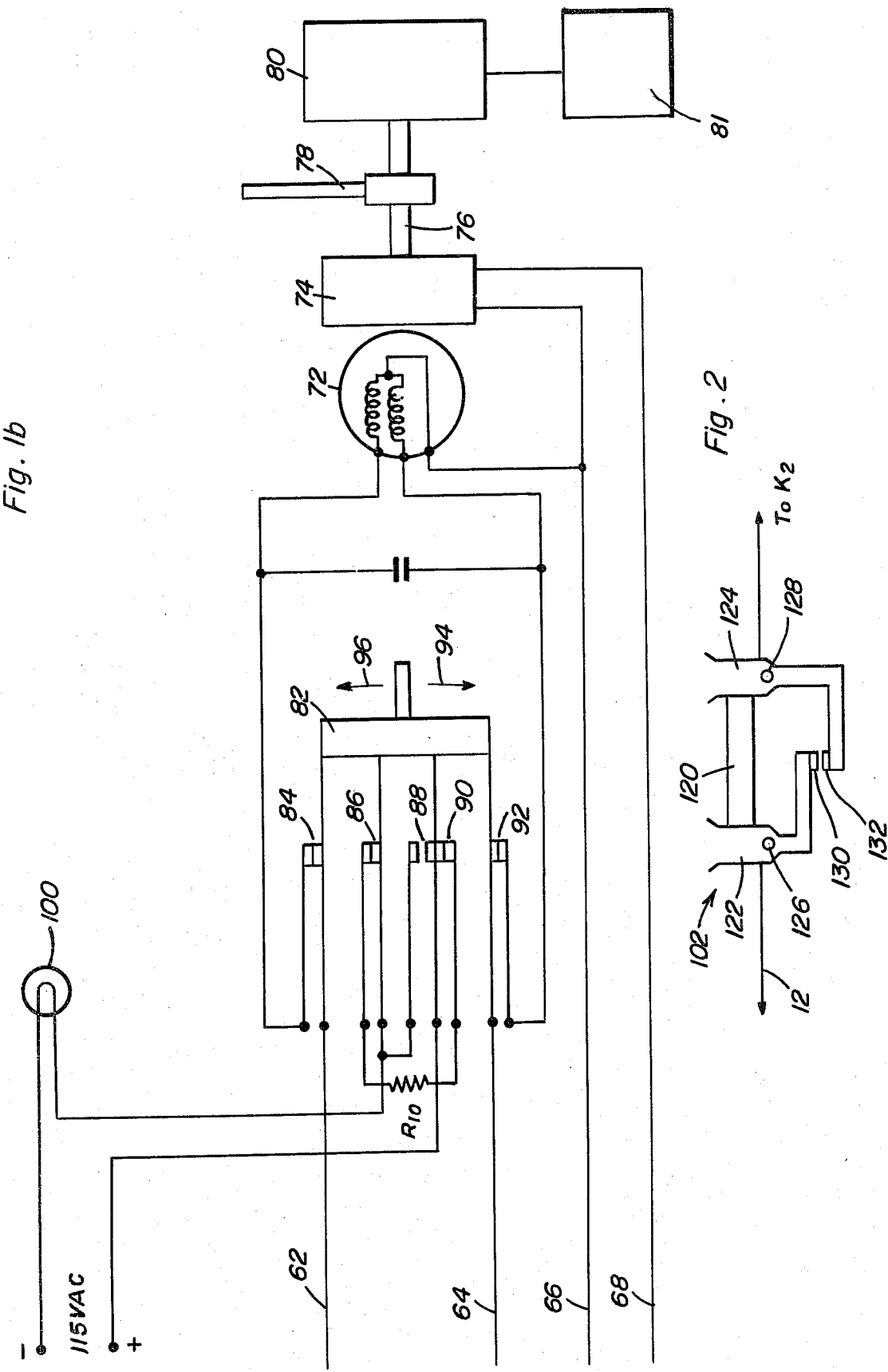

CONTROL SYSTEM FOR GAS KILN

BACKGROUND OF THE INVENTION

1. Field of the Invention

This invention relates to control systems for gas kilns which automatically control the firing of the kiln both during the heating period and the cooling period.

2. Description of the Prior Art

The production of ceramic products from clay normally requires constant supervision of a kiln over an extended period in order to make sure that the clay being baked in the kiln is properly matured. The maturation point of the clay is very critical since undermature ceramic products tend to be brittle while overmature clay bodies will melt in the kiln. Due to the fact that both temperature and kiln chamber environment affect the maturation of clay, it is very difficult to determine the exact point of critical maturation. For this reason pyrometric piles or clay cones are used to indicate the point at which the clay is mature enough to discontinue the baking. The pyrometric pile has characteristics similar to the clay being baked and under increasing temperature it will gradually soften, sag, and finally prostrate itself to indicate ideal maturation. Normally this process is monitored by the kiln operator through a small orifice in the door of the kiln.

Certain pyrometric switches have been used in the past in order to automatically turn the kiln off when the maturation of the clay has been reached. Included among these is U.S. Pat. No. 2,675,600, issued Apr. 20, 1954, to Dawson. The Dawson patent teaches the use of a rod pivotally attached toward the center thereof with one end of the rod resting upon a cone. When the cone sags, the rod pivots lifting the opposite end thereof which actuates the switch to turn the kiln off. U.S. Pat. No. 3,287,530, issued Nov. 22, 1966, to Dawson, discloses a similar type pyrometrically actuated switch in which the pyrometric cone sags causing a release claw fastened to an actuating rod to move out of engagement from a moveable weight. The weight falls downwardly and a stud protruding therefrom releases a spring biased plunger having moveable conductor means or straps, thereby creating a circuit discontinuity and hence an interruption of power flow to the kiln. U.S. Pat. No. 3,838,377, issued Sept. 24, 1974, to Vukovich, shows a pyrometric member having means, such as a uniform transverse cross section or a notch in which the rod of a switch actuating mechanism may rest, to accurately regulate the amount of heat required to cause deformation of the member.

Certain control systems for controlling the temperature in kilns, furnaces, and other similar devices, have been used also. For instance, U.S. Pat. No. 2,505,041, issued Apr. 25, 1950, to Gorsuch, shows a drying apparatus having operation sequence control. The Gorsuch device uses a series of cam operated switches controlled by a motor to actuate certain heating coils in the tumbler motor of a conventional home drying apparatus. U.S. Pat. No. 2,977,452, issued Mar. 28, 1961, to Weber et al, shows a capacitance type temperature control for automatically controlling temperature within an enclosure. U.S. Pat. No. 3,901,437, issued Aug. 26, 1975, to Harkins, shows a programmed temperature control system for a furnace or kiln. The Harkins device uses a thermocouple position within the kiln to provide a signal indicative of the temperature of the kiln. A slidewire potentiometer provides a command signal indicating a preselected maximum temperature to be reached by the kiln, and a ramp generator provides a variable voltage, the contour of which is to be followed by the kiln when progressing from a low temperature to the maximum preselected temperature.

SUMMARY OF THE INVENTION

An object of my present invention is to provide a control for a kiln or similar device which will easily and inexpensively control the temperature of the kiln both while the kiln is heating and while the kiln is cooling. In accordance with this object, I have provided an unique use for a pyrometric cone wherein the cone is used to reverse direction of a motor controlling a valve for the heating of a gas kiln.

An additional object of my present invention is to provide a control for a gas kiln in which the temperature in the kiln is increased at periodic intervals with the time between the temperature increases being selectable at the option of the kiln operator.

A still further object of my present invention is to provide a kiln temperature control wherein the temperature is increased in the kiln by periodically increasing the gas flow to the kiln by the opening of the gas control valve an additional predetermined amount. My invention provides flexibility in that the additional gas flow may be controlled by the setting of a timing circuit which controls the amount of time a motor operates with the motor opening the gas control valve.

Yet an additional object of my invention is to provide a temperature control for a kiln which temperature control may be operated manually, if desired.

Yet a still further object of my present invention is to provide a control in which a visual indication is given concerning the state of the gas flow control valve. A light is provided which indicates if the control valve is open, fully open, or fully closed.

Yet a still further object of my invention is to provide a control system which has incorporated therein a means for calibrating the system to insure that the proper desired temperature rise will be effected by the system.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1b is a schematic diagram representing the control of the motor as effected by the timing circuits of FIG. 1a.

FIG. 2 is an illustration of the pyrometric switch as used in FIG. 1a.

DESCRIPTION OF THE PREFERRED EMBODIMENT

Figure 1A:
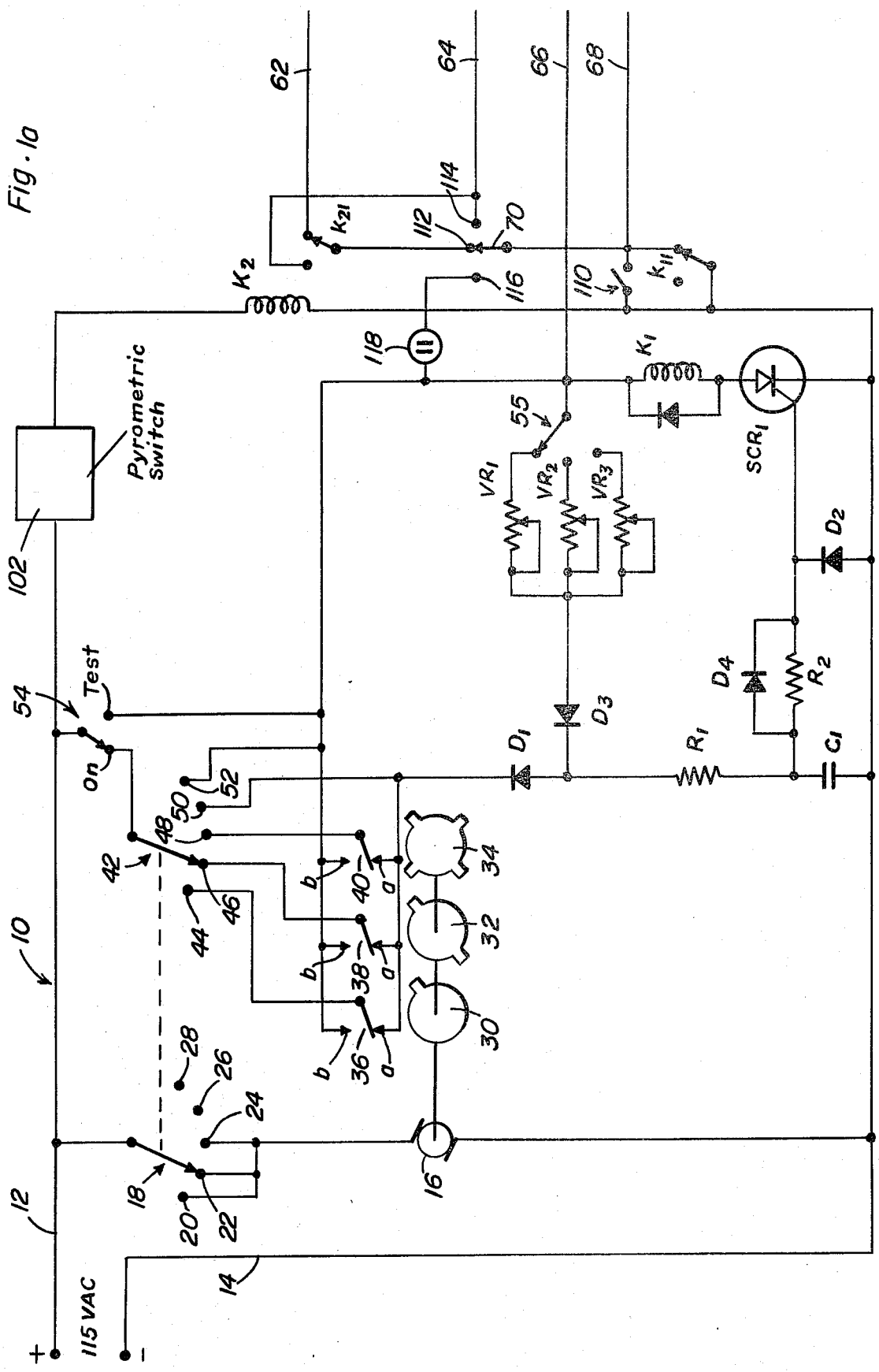
FIG. 1a is a schematic diagram illustrating the variable timing circuits of the present control system.

Now with reference to the figures, the control system of the present invention will be described. With reference to FIG. 1a, the timing circuit of the present invention is generally referred to by the numeral 10. The circuit has supply lines 12 and 14 which provide standard 115 volt AC power to the circuit. Motor 16 is an AC motor producing one revolution per hour. Power is supplied to motor 16 through switch 18 which has five contact positions associated with it. These contact positions are labelled 20, 22, 24, 26 and 28. In contact positions 20, 22 and 24, power is supplied to motor 16. Motor 16 has three cams associated with its rotor labelled 30, 32 and 34. Associated with each cam is a switch, these switches being labelled respectively 36, 38 and 40. Each of the switches is positioned to be biased by the lobes on the cam with which it is associated. In their normal unbiased positions, each switch is positioned against its respective contact a. In the biased position, each switch is positioned against its contact b. The wiper of each switch is connected to one contact of five position switch 42. The contacts of switch 42 are labelled 44, 46, 48, 50 and 52. Switch 42 is connected to supply line 12 through switch 54. Switch 54 has two positions one labelled "on" and one labelled "test". In the on position, switch 54 supplies power to switch 42. Switch 42 is ganged to switch 18 and with these switches in one of their first three positions, the motor 16 is allowed to drive cams 30, 32 and 34. In this manner, it will be seen that with switch 42 connected to contact 46, capacitor $C_1$ is allowed to charge through resistor $R_1$, diode $D_1$, contact a of switch 38, switch 42, and switch 54. It will be noted that the capacitor will charge only during that time that the lobes of cam 32 are not in contact with the wiper of switch 38.

With motor 16 revolving once every hour, the lobe of cam 30 biases the wiper of switch 36 against contact b of switch 36 once every hour, cam 32 biases the wiper of switch 38 against contact b of switch 38 twice every hour and cam 34 biases the wiper of switch 40 against contact b of switch 40 four times every hour. With the wiper of the appropriate switch as selected by switch 42 biased against its contact b, it will be seen that power will be delivered to solenoid $K_1$. At the same time, with capacitor $C_1$ fully charged through line 14, the gate of $SCR_1$ is biased in a direction such that $SCR_1$ is deactivated. Capacitor $C_1$ discharges through diode $D_2$ and resistor $R_2$. Capacitor $C_1$ also discharges through one of the variable resistors $VR_1$, $VR_2$, or $VR_3$ as selected by switch 55, and through diode $D_3$ and resistor $R_1$. $SCR_1$ remains deactivated until the negative charge of capacitor $C_1$ is reduced sufficiently to activate $SCR_1$ and therethrough $K_1$. Therefore, it will be seen that, depending on the selection of switch 36, 38 or 40, solenoid $K_1$ may be actuated once, twice or four times per hour after a time delay chosen by selection of $VR_1$. $VR_2$ or $VR_3$. It will be understood that any number of actuations of solenoid $K_1$ may be effected by proper selection of the lobes on one of the cams provided on the shaft of motor 16.

Prior to the activation of relay $K_1$, normally closed contacts $k_{11}$ are closed. This provides for electrical communication from line 14 to line 62 through contacts $k_{11}$, switch 70, contact 112 and contacts $k_{21}$ of relay $K_2$. It is also noted that an electrical circuit from line 12 through switch 54, switch 42, switch 38 to line 66 is made when the wiper of switch 38 is appropriately biased. After activation of $SCR_1$ and $K_1$, this circuit is opened as contacts $k_{11}$ are pulled to their open position.

Now with reference to FIG. 1b, it will be seen that a one revolution per minute reversible AC motor 72 is attached to a clutch and brake mechanism 74 which drives shaft 76 to which is attached cam 78 and valve 80. Motor 72 is driven through switch contractor 82 which has connected thereto contacts 84, 86, 88, 90, and 92. Switch contactor 82 is driven by cam 78 with the contactor being driven in the direction of arrow 94 when the valve is fully open and in the direction of arrow 96 when the valve is fully closed. Thus, it will be seen that in the position as shown the valve is open, but not fully open. Therefore, contacts 84, 86, 90 and 92 are closed and contacts 88 are open. This provides current through the 115 volt AC source through light bulb 100, contacts 86, resistor $R_{10}$, and contacts 90. Thus, light bulb 100 will light dimly as the voltage delivered thereto is reduced by resistor $R_{10}$. When the valve 80 is fully closed, contacts 84, 86 and 88 are closed, thus providing a full 115 volt source to light bulb 100 through contact 88 and fully lighting the bulb. With the valve fully open, contacts 90 and 92 are closed, thus providing no current to light bulb 100.

As discussed previously with reference to FIG. 1a, line 62 shown in FIG. 1b is electrically connected to supply line 14 while line 66 of FIG. 1b is electrically connected to supply line 12 of FIG. 1a. Thus current may travel through line 62, contacts 84, motor 72 and line 66 to drive motor 72 in a forward direction. At the same time, clutch and brake mechanism 74 is actuated through line 66, and line 68 which is in communication with supply line 14 through contacts $k_{11}$. Thus it may be seen that with the connections shown in FIG. 1a and 1b, motor 72 will be actuated two times per hour and thus valve 80 will be opened by two increments which are determined by the length of time it takes for capacitor $C_1$ to discharge and this time delay is determined by the setting of switch 54 and the appropriate adjustment of the selected variable resistor, $VR_1$ through $VR_3$.

Again referring to FIG. 1a, a pyrometric switch box 102 is located within the kiln itself and provides electrical communication of relay $K_2$ with supply lines 12 and 14 when the object being baked in the kiln has reached maturation. With actuation of relay $K_2$, contacts $k_{21}$ communicate supply line 14 with line 64. With reference to FIG. 1b, it will be seen that line 64 provides current through contacts 92 for reverse operation of motor 72. Therefore, it will be understood that upon maturation of the ceramic baking in the kiln, pyrometric switch box 102 will be effective to change direction of motor 72 in order to provide for the progressive cooling of the kiln until the motor is turned off by actuation of switch actuator 82 by cam 78. In the automatic mode of operation, the user merely sets wiper 42 to connect the desired cam 30, 32 or 34 into the circuit. With, for example, cam 32 inserted as shown in FIG. 1a, rotation of motor 16 at one revolution per hour insures that switch 38 is activated twice per hour. Upon each actuation of switch 8, power is transmitted through stationary contact b to line 66 thereby energizing motor 72 in a forward direction through contacts 84. Line 66 also causes the clutch of mechanism 74 to engage to transmit power to valve 80 thus opening the valve incrementally. The incremental amount of opening of valve 80 is determined by the value of capacitor C1 and the value of resistor VR1, VR2 or VR3 as chosen by the operator. Once capacitor C1 times out, SCR1 energizes thus causing energization of K1 thereby moving contacts $K_{11}$ to the normally open position to remove current from motor 72 and mechanism 74 which thereupon applies the brake to insure that valve 80 is held in its new position. Obviously, valve 30 controls the amount of gas being passed to burner device 81 in a known manner and therefore, each incremental opening of valve 80 causes a hotter flame to burn within the kiln thereby increasing the temperature within the kiln. This incremental opening of valve 80 through operation of cam 32 on a twice per hour basis is continued until valve 80 is fully opened. Full opening of valve 80 is indicated by cam 78 contacting actuator 82 thereby opening contacts 84 to inhibit any further energization of motor 72 in the same direction. Once the article in the kiln is fully cured, pyrometric switch 102 operates to cause energization of relay K2 thereby moving contacts $K_{21}$ to the normally open position. Accordingly, current passed through contact b of switch 38 upon each actuation is effective to rotate motor 72 in the reverse direction through line 64. The clutch of mechanism 74 is engaged and valve 80 is incrementally closed by a predetermined amount on a twice per hour basis until the valve is fully closed as indicated by contact of cam 78 with actuator 82 to open contacts 92 thus inhibiting any further energization of motor 72 in the reverse direction.

Manual operation of the control valve is also available. With the wiper of switch 42 contacting contact 52, it will be noted that switch 18, ganged to switch 42, will be in position 28 and motor 16 will no longer operate. Contact 52 provides power to line 66. In order to operate the device, momentary switch 110 is closed whereupon the motor will turn in the forward direction thus opening valve 80. When it is desired to close valve 80, switch 70 should be turned from position 112 to position 114 whereupon line 64 is provided with current to turn the motor in the reverse direction.

When it is desired to calibrate the control system in order to determine the exact amount of time which motor 72 will be activated upon each actuation of one of the switches 36, 38 or 40 by one of the lobes on the cam, the wiper of switch 42 is connected to position 50. In position 50, switch 18 is connected to position 26 which deactivates motor 16. Also, capacitor $C_1$ is allowed to fully charge. Switch 70 is connected to position 116 which places neon light 118 in the circuit. Switch 74 is then positioned to the test position whereupon momentary switch 110 may be depressed and light 118 will glow for the amount of time during which motor 72 would ordinarily be activated. In this manner, one of the variable resistors $VR_1$ through $VR_3$ may be selected by switch 55 and adjusted to give the desired results.

Now with reference to FIG. 2, the contents of pyrometric switch box 102 will be described in detail. A pyrometric rod 120 is connected between two holders 122 and 124 which holders are pivotally mounted to the walls of its container at points 126 and 128. The holders have downwardly depending and transversely extending arms containing contacts 130 and 132. When the temperature in the kiln causes the pyrometric rod to soften and sag in the center, contacts 130 and 132 will be connected thus completing the circuit to relay $K_2$ and reversing the motors 72.

In operation, it will be readily apparent that the user of the system may calibrate the system according to the method described above and then set switch 42 to include the appropriate cam 30, 32 or 34 in the circuit according to the desired rate of heat increase in the kiln. Thereafter, the circuit will automatically actuate $SCR_1$ periodically thereby progressively opening valve 80 and increasing the heat in the kiln until pyrometric switch 102 effects actuation of relay $K_2$ whereupon contacts $k_{21}$ are pulled into their normally open position whereupon motor 72 is reversed and valve 80 is progressively closed in accordance with the time delay sequence as originally set.

The same invention may be used with other than gas kilns with only minor modifications. For example, an electric kiln may be controlled with the exact same components except for the use of a rheostat in the supply line to the electric heating unit being used in place of the gas control valve 80. In such a unit, motor 72 would rotate to increase or decrease the resistance of the rheostat thereby increasing or decreasing the heat given off from the electric heater in the kiln. Other types of heating units may be controlled in the same manner and are, therefore, considered to be within the scope of this invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A control for a heating device comprising: time delay means including a capacitor, a resistor, and a thyratron device controlled by the electrical discharge from said capacitor through said resistor for providing a heat control signal, said heat control signal being of a predetermined duration; actuation means for actuating said time delay means at predetermined periodic intervals; and means for adjusting said time delay means to vary the duration of said heat control signal, heat control means responsive to said heat control signal to vary the heat supplied to the heating device.

2. The control according to claim 1 including means for adjusting said time delay means to vary the duration of said heat control signal.

3. The control as claimed in claim 1 including means to adjust said actuation means to control the period between actuations of said time delay means.

4. The control of claim 3 wherein said actuation means includes a periodically operated switch.

5. The control of claim 1 including a routing means for transmitting said heat control signal to said heat control means in either a first mode for producing a heat increase or a second mode for producing a heat decrease in said heating device.

6. The control of claim 5 further including a temperature responsive means for changing the mode of operation of said routing means in response to the temperature in said heating device.

7. The control of claim 6 wherein said temperature responsive means includes a pyrometric element.

8. The control of claim 1 including calibration means for producing a visual signal indicative of the duration of said heat control signal.

9. A control for a heating device comprising: time delay means for providing a heat control signal, said heat control signal being of a predetermined duration; actuation means including a periodically operated switch for actuating said time delay means at predetermined periodic intervals; and heat control means responsive to said heat control signal to vary the heat supplied to the heating device; means to adjust said actuation means to control the period between actuations of said time delay means; wherein said switch is a two position switch and wherein in one position the switch is operative to provide power to a timing capacitor and in the second position is operative to provide power to said heat control means.

10. The control of claim 5 wherein said heat control means is a reversible electric motor which is periodically operated in response to said heat control signal.

11. The control of claim 10 wherein said heat control means further includes a valve connected to said motor and positioned in the gas supply line to a gas fired kiln.

12. The control of claim 10 wherein said heat control means further includes a variable resistor connected to said motor and positioned in the electrical supply to an electrically heated kiln.

13. The control of claim 4 wherein said switch is periodically operated by a cam device connected to a continuously rotating motor.

* * * * *